July 28, 1931.  E. J. BURNHAM  1,816,713
ELECTRICAL REGULATING SYSTEM
Filed Nov. 1, 1929
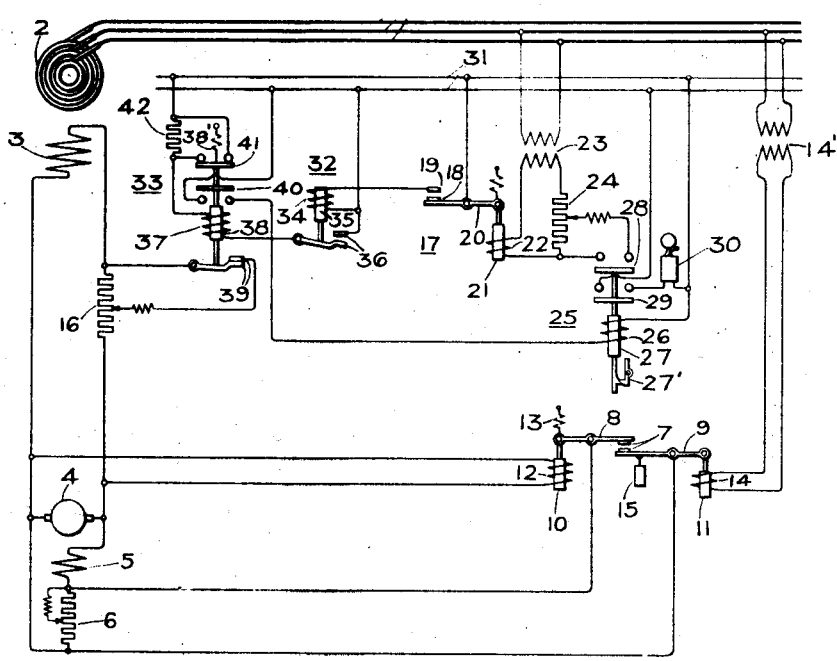
Inventor:
Elmer J. Burnham,
by Charles E. Tullar
His Attorney.

Patented July 28, 1931

1,816,713

UNITED STATES PATENT OFFICE

ELMER J. BURNHAM, OF SCOTIA, NEW YORK, ASSIGNOR TO GENERAL ELECTRIC COMPANY, A CORPORATION OF NEW YORK

ELECTRICAL REGULATING SYSTEM

Application filed November 1, 1929. Serial No. 404,119.

My invention relates to electrical regulating systems and more particularly to regulating systems for controlling the voltage of alternating current generators.

In the operation of alternating current generators the voltage of the generator tends to rise to very high values on sudden loss of load. This is particularly true in case of waterwheel-driven generators because of overspeed of the waterwheel when the generator load is suddenly decreased. Since the overvoltages on generators may reach 100 to 150% above the normal operating value, it is very desirable in many cases to limit the rise of voltage. Various overvoltage devices and overspeed devices have been employed heretofore whereby the generator circuit breaker and field switch are tripped at a predetermined voltage or predetermined speed, but these devices disconnect the generator from the bus and thereby cause considerable delay in getting the generator back into service.

It is an object of my invention to provide an improved system of regulation for controlling the voltage of a dynamo-electric machine when it is subjected to operating conditions tending to cause its generated voltage to rise abnormally.

Another object of my invention is to provide an improved system of regulation for an alternating current generator whereby upon the occasion of a rise in generator voltage the voltage is quickly reduced to a predetermined value and maintained at substantially that value by the voltage reducing means until normal conditions are restored.

My invention will be better understood from the following description taken in connection with the accompanying drawing and its scope will be pointed out in the appended claims.

In the accompanying drawing the single figure is a diagrammatic representation of an embodiment of my invention particularly adapted for use in connection with a three-phase alternating current generator.

Referring to the drawing, 1 represents the conductors of a three-phase distribution circuit connected to be energized from a dynamo-electric machine diagrammatically illustrated as a synchronous alternating current generator 2 having its field winding 3 energized by an exciting dynamo-electric machine 4. This exciting machine has a shunt field winding 5. An adjustable regulating resistance 6 is connected in series with the field winding 5 and arranged to be cut into and out of the exciter field circuit by hand or some form of automatic voltage regulator, such for instance as a vibratory regulator of the Tirrill type, and here shown as comprising a pair of floating contacts 7 for shunting the resistance as voltage conditions may require. The contacts 7 are carried by a pair of levers 8 and 9 actuated respectively by the plungers 10 and 11. The plunger 10 is attracted by the electromagnetic winding 12 connected across the terminals of the exciting machine 4, the pull of winding 12 on lever 8 being opposed by a spring 13. The plunger 11 is lifted by the electromagnetic winding 14 which is connected across the conductors 1 through a suitable potential transformer 14'. The weight of the plunger 11 is arranged to be counterbalanced to any desirable extent by a weight 15.

Now in accordance with my invention a variable resistance is inserted in circuit with the excitation circuit of the alternating current generator by an overvoltage relay when the voltage of the generator reaches a predetermined value. Preferably an adjustable resistance 16 is connected as shown in series with the generator field winding 3 because the insertion of the resistance in series with the field winding 5 of the exciting machine is not very effective in reducing the generator voltage, due to the inductance in the exciter and generator fields. The inclusion and exclusion of the resistance 16 is controlled by a relay 17 which is connected to be responsive to the voltage of generator 2. As shown, the relay 17, which for convenience has been referred to as an overvoltage relay, comprises cooperating contacts 18 and 19. Contact 18 is carried by a pivoted lever arm 20 which is arranged to be actuated by electromagnetic means comprising a plunger 21 connected to the lever and an operating winding 22 connected across the conductors 1 through a suitable potential transformer 23. An adjustable resistance 24 is connected in series with the operating winding 22 for changing the calibration of the overvoltage relay 17 to hold normal voltage, or a voltage of some predetermined value, after the overvoltage relay has operated.

This change in the calibration of the overvoltage relay 17 is effected by means of a relay 25 which is arranged to be operated in accordance with the operation of relay 17. Relay 25 is of the hand reset type and comprises an electromagnetic operating means consisting of an operating winding 26 and an armature 27. A latching device 27' cooperates with the movable armature 27 and is arranged to lock the armature in its circuit closing position after it has been operated to that position until it is released manually. The armature 27 is arranged to operate contacts 28 and 29. When the operating winding 26 of relay 25 is energized, the contacts 28 are arranged to short-circuit a portion of the resistor 24 connected in series with the operating winding 22 of relay 17, and contacts 29 are arranged to close a signal circuit including a signal device 30 shown as a bell. The operating winding 26 of relay 25 is connected to be energized from a convenient and suitable source of electrical energy indicated by the conductors 31 which may be a constant voltage station bus or a bus energized from the exciter 4.

In order to reduce the current handled by the contacts 18 and 19 of the overvoltage relay 17 I provide an intermediate relay 32 which controls a contactor 33 arranged to control the inclusion and exclusion of the resistor 16 in the field circuit of generator 2 and the energization of relay 25. The relay 32 comprises an operating winding 34 and an armature 35 arranged to control contacts 36 for controlling the energizing circuit of contactor 33 from the bus 31.

The operating winding 34 of relay 32 is connected in series with the contacts of the overvoltage relay 17 to be energized from the bus 31. The contactor 33 comprises an operating winding 37 connected to be energized from the bus 31 and an armature 38 arranged to operate contacts 39 which are connected across the resistor 16.

The armature 38 is held in its normal operating position in which contacts 39 are closed by suitable biasing means illustrated as a spring 38', and is operated to open contacts 39 when the operating winding 37 is energized. It will occur to those skilled in the art that the contacts 39 could be arranged to be closed electromagnetically for normal operating conditions and opened by gravity or spring biasing means upon deenergization of winding 37 without departing from my invention in its broader aspects. The contactor 33 is provided with an auxiliary switch 40 which is arranged to be closed when the contactor is in a circuit opening position and open when the contactor is in a circuit closing position. The switch 40 is connected in circuit with the energizing winding of relay 25 and energizes this relay as soon as the contacts 39 of the contactor 33 open. In case the contactor 33 is energized from the voltage of exciter 4 an additional auxiliary switch 41 is provided to exclude a resistor 42 connected in series with the operating winding 37 of the contactor 33 under normal operating conditions and to insert the resistor as soon as the coil 37 has been energized. In case the contacts 39 are normally held closed electromagnetically and opened by gravity, the switch 41 would short-circuit the resistor 42 when contacts 39 were opened. This arrangement is provided to change the value of the resistance in the circuit of the operating winding of the contactor so that the contactor may be operated over a wide range of exciter voltage.

The operation of the arrangement illustrated in the drawing is substantially as follows: It will be assumed that the generator 2 is being operated under normal conditions by any prime mover which tends to overspeed when load supplied by the generator is suddenly decreased, and that the exciter 4 is being operated to maintain normal voltage conditions in the circuit 1 under the influence of the regulator contacts 7. The various relays and contacts are assumed to be in the positions illustrated in the drawing. The overvoltage relay 17 must necessarily be calibrated by adjusting resistance 24 to operate at some voltage above the normal operating value of the generator, for example, 30% above the normal value. In the event of a sudden decrease in load on generator 2, the voltage thereof will rise suddenly above the normal operating value, and as soon as the voltage reaches the value for which the relay 17 is set to operate, its contacts 18 and 19 are closed to complete an energizing circuit for the intermediate relay 32 from the station bus 31. The intermediate relay 32 closes its contacts 36 to complete an energizing circuit from the station bus 31 for the operating winding of contactor 33. Contactor 33 is then operated to open its contacts 39 and open circuit the portion of resistance 16, normally short-circuited and thereby insert resistance 16 in the generator field circuit. The insertion of resistance 16 in the generator field circuit in the manner has been found to be as effective, as far as over-voltage is concerned, as opening the generator oil circuit breaker and field switch. At the same time that contactor 33 has operated its contacts 39 to insert resistance 16 in the generator field circuit the auxiliary switch 40 is operated to complete the energizing circuit for relay 25. In case the bus 31 is energized from the exciter 4 the auxiliary switch 41 and resistor 42 will be utilized. In this event as contactor 33 is operated to insert resistance 16 in the generator field circuit the resistance 42 is inserted in series with the operating coil 37.

Upon the energization of the operating winding of relay 25 its contacts 29 are operated to close an energizing circuit for the alarm 30 and at the same time contacts 28 are arranged to short-circuit the resistance 24 connected in circuit with the overvoltage relay 17. This changes the calibration of the overvoltage relay so that its pickup voltage is now changed to a voltage, for example, corresponding approximately to the normal operating voltage of the generator. As a result the relay 17 closes and opens its contacts periodically in a manner to maintain the voltage of the generator 2 at substantially its normal operating value. In other words, in the absence of a voltage regulator, the overvoltage relay 17, in conjunction with the intermediate relay 32 and contactor 33, functions as a voltage regulator, opening and closing the contacts of the respective devices to hold the desired value of voltage until the operator can come at the sound of the alarm and reset the relay 25 and put the generator back into normal service with the overvoltage relay 17 in condition to operate at the predetermined overvoltage. When the generator is provided with an automatic voltage regulator, the value of the lower pickup voltage of relay 17 is raised slightly above that of the regulator operating coil so that the voltage regulator may take over the control from the relay 17 soon after the initial rise in voltage has been suppressed, whereby the magnitude of the voltage oscillations above or below the mean average value is decreased even before the relay 25 is manually placed in its normal operating position.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a dynamo-electric machine, a field winding therefor, means for exciting said field winding, means responsive to a predetermined abnormal electrical condition of said dynamo-electric machine for substantially changing the excitation of said dynamo-electric machine, and means controlled by said last mentioned means for modifying the action of said last mentioned means after the initial operation thereof in responding to said predetermined abnormal electrical condition.

2. In combination, a generator, a field winding therefor, an exciter connected to said field winding, a normally short-circuited resistance connected in circuit with said field winding, electromagnetic means for removing the short circuit around said resistance when the voltage of said generator rises a predetermined amount above the normal operating value, and means controlled by said electromagnetic means for changing the calibration of said electromagnetic means after the initial operation thereof following its response to the predetermined rise in said voltage.

3. The combination with an electrical distribution circuit, of a synchronous generator connected thereto, a field winding for said generator, an exciter for said field winding, a resistance connected in circuit with said field winding, means for normally establishing a closed circuit around said resistance and operative in accordance with an abnormal rise in the voltage of said generator for opening said closed circuit, and means for intermittently closing and opening said normally closed circuit in response to a lower value of said generator voltage after the initial response of said last mentioned means to said abnormal rise in generator voltage.

4. The combination with an electrical distribution circuit, of a synchronous generator connected thereto, a field winding for said generator, an exciter for said field winding, a resistance connected in circuit with said field winding, a contactor normally closed for shunting said resistance, a relay responsive to a predetermined rise in generator voltage above its normal operating value for opening said contactor, and means for modifying the operation of said relay after said contactor has moved to its open position.

5. The combination with an electrical distribution circuit, of a synchronous generator connected thereto, a field winding for said generator, an exciter for said field winding, a resistance connected in circuit with said field winding, a contactor normally shunting said resistance, a relay responsive to an abnormal generator voltage for opening said contactor, and switching means operated when said contactor opens for changing the calibration of said relay.

6. The combination with an electrical distribution circuit, of a synchronous generator connected thereto, a field winding for said generator, an exciter for said field winding, a resistance connected in series with said field winding, a contactor normally shunting said resistance, a relay normally responsive to a predetermined rise in voltage of said generator above the normal operating voltage thereof for opening said contactor, and switching means controlled by the opening of said contactor for changing the voltage calibration of said relay after the initial opening operation of said contactor so as to cause operation of said relay thereafter at substantially the normal operating voltage of said generator.

7. The combination with an electrical distribution circuit, of a synchronous generator connected thereto, a field winding for said generator, an exciter for said field winding, a resistance connected in series with said field winding, a contactor normally closed for shunting said resistance, a relay normally arranged to open said contactor when the voltage of said generator exceeds a predetermined value above its normal operating voltage, a resistance connected in series with said relay, a second relay having normally open contacts connected across the resistance in series with said relay, and switching means operated by the opening of said contactor for energizing said second relay to close its contacts.

8. The combination with an electrical distribution circuit, of a synchronous generator connected thereto, a field winding for said generator, an exciter for said field winding, a resistance connected in series with said field winding, a contactor normally closed for shunting said resistance, a relay normally arranged to open said contactor when the voltage of said generator exceeds a predetermined value above its normal operating voltage, a resistance connected in series with said relay for changing its calibration, a second relay having normally open contacts connected across said calibrating resistance, switching means operated by the opening of said contactor for energizing said second relay to close its contacts, and means for locking said second relay in its contact-closing position.

9. The combination with an electrical distribution circuit, of a synchronous generator connected thereto, a field winding for said generator, an exciter for said field winding, a resistance connected in circuit with said field winding, a contactor normally closed for shunting said resistance, a relay operative upon a predetermined voltage rise in said distribution circuit for opening said contactor, and switching means arranged to be operated when said contactor opens for extending the normal range of operation of said contactor and changing the calibration of said relay.

In witness whereof, I have hereto set my hand this 31st day of October, 1929.

ELMER J. BURNHAM.